US012713482B2

(12) United States Patent
Seok et al.

(10) Patent No.: US 12,713,482 B2
(45) Date of Patent: Aug. 18, 2026

(54) EHT EMLSR TWT OPERATION IN WIRELESS COMMUNICATIONS

(71) Applicant: MediaTek Inc., Hsinchu City (TW)

(72) Inventors: Yongho Seok, San Jose, CA (US); James Chih-Shi Yee, San Jose, CA (US)

(73) Assignee: MediaTek Inc., Hsinchu City (TW)

( * ) Notice: Subject to any disclaimer, the term of this patent is extended or adjusted under 35 U.S.C. 154(b) by 295 days.

(21) Appl. No.: 18/370,466

(22) Filed: Sep. 20, 2023

(65) Prior Publication Data

US 2024/0098821 A1 Mar. 21, 2024

Related U.S. Application Data

(60) Provisional application No. 63/376,450, filed on Sep. 21, 2022.

(51) Int. Cl.
*H04W 76/15* (2018.01)

(52) U.S. Cl.
CPC .................................. *H04W 76/15* (2018.02)

(58) Field of Classification Search
None
See application file for complete search history.

(56) References Cited

U.S. PATENT DOCUMENTS

2022/0110053 A1* 4/2022 Chu .................. H04W 52/0216
2022/0303893 A1* 9/2022 Chu ...................... H04W 76/40
2023/0103061 A1* 3/2023 Shafin ............... H04W 52/0216 370/311
2023/0180124 A1* 6/2023 Shafin ............... H04W 52/0216 370/311
2023/0413328 A1* 12/2023 Kim .................. H04W 52/0274
2024/0015649 A1* 1/2024 Kneckt ................. H04W 76/15

OTHER PUBLICATIONS

European Patent Office, Extended European Search Report in European Patent Application No. 23198735.5, Feb. 16, 2024.
Chunyu Hu (Meta): "LB266 CR for some CIDs in 35.9, 35.9.1, ,35.9.2, 35.9.4 and 35.9.4.1", 11-22-1470-04-00BE-LB266-CR-FOR-SOME-CIDS-IN-35-9-35-9-1-35-2-2-35-9-4-AND-35-9-4-1, IEEE-SA Mentor, Piscataway, NJ USA, vol. 802.11 EHT; 802.11be, No. 4, Sep. 14, 2022 (Sep. 14, 2022), pp. 1-21, XP068193944.
"35. Extremely high throughput (EHT) MAC specification 35.1 Introduction", IEEE Draft; TGBE_CL_35, IEEE-SA, Piscataway, NJ USA, vol. 802.11be drafts, No. D2.0, ,May 23, 2022 (May 23, 2022), pp. 1-142, XP068192148.

* cited by examiner

*Primary Examiner* — Diane L Lo
(74) *Attorney, Agent, or Firm* — Andy M. Han; Han IP PLLC

(57) ABSTRACT

Various techniques and schemes pertaining to extremely-high throughput (EHT) enhanced multi-link single-radio (EMLSR) target wake time (TWT) operation in wireless communications are described. A non-access point (non-AP) multi-link device (MLD) enables an enhanced multi-link single-radio (EMLSR) mode. The non-AP MLD also establishes one or more TWT agreements with an access point (AP) MLD on a first link and a second link of multiple links such that data exchange between a first station (STA) affiliated with the non-AP MLD and a first AP affiliated with the AP MLD occurs on the first link during a TWT service period (SP) while an EMLSR mode operation is performed on the second link.

14 Claims, 9 Drawing Sheets

600

| | TWT Flow Identifier | Link ID Bitmap Present | Reserved | Negotiation Type | Teardown All TWT | Link ID Bitmap |
|---|---|---|---|---|---|---|
| Bits: | 3 | 1 | 1 | 2 | 1 | 0 or 16 |

<TWT Flow field format>

Figure 9:
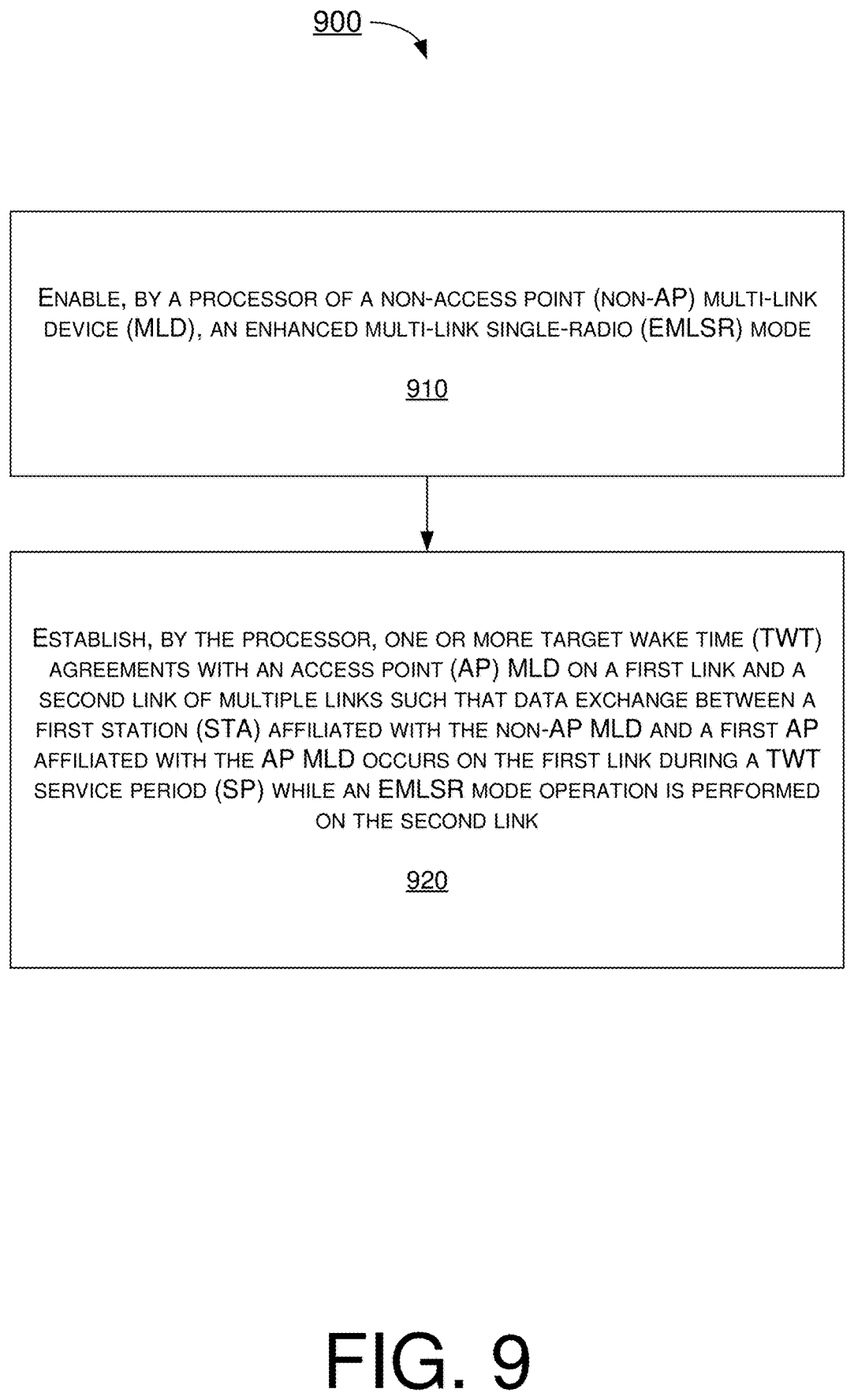

ENABLE, BY A PROCESSOR OF A NON-ACCESS POINT (NON-AP) MULTI-LINK DEVICE (MLD), AN ENHANCED MULTI-LINK SINGLE-RADIO (EMLSR) MODE

910

ESTABLISH, BY THE PROCESSOR, ONE OR MORE TARGET WAKE TIME (TWT) AGREEMENTS WITH AN ACCESS POINT (AP) MLD ON A FIRST LINK AND A SECOND LINK OF MULTIPLE LINKS SUCH THAT DATA EXCHANGE BETWEEN A FIRST STATION (STA) AFFILIATED WITH THE NON-AP MLD AND A FIRST AP AFFILIATED WITH THE AP MLD OCCURS ON THE FIRST LINK DURING A TWT SERVICE PERIOD (SP) WHILE AN EMLSR MODE OPERATION IS PERFORMED ON THE SECOND LINK

EHT EMLSR TWT OPERATION IN WIRELESS COMMUNICATIONS

CROSS REFERENCE TO RELATED PATENT APPLICATION(S)

The present disclosure is part of a non-provisional patent application claiming the priority benefit of U.S. Provisional Patent Application No. 63/376,450, filed 21 Sep. 2022, the content of which being herein incorporated by reference in its entirety.

TECHNICAL FIELD

The present disclosure is generally related to wireless communications and, more particularly, to extremely-high throughput (EHT) enhanced multi-link single-radio (EMLSR) target wake time (TWT) operation in wireless communications.

BACKGROUND

Unless otherwise indicated herein, approaches described in this section are not prior art to the claims listed below and are not admitted as prior art by inclusion in this section.

In a wireless local area network (WLAN) according to current Institute of Electrical and Electronics Engineers (IEEE) 802.11 specifications, concurrent TWT agreements can be established on more than one link between an access point (AP) multi-link device (MLD) and a non-AP MLD, where a TWT service period (SP) of the TWT agreements overlap in time. An AP MLD cannot establish concurrent TWT agreements for a single-radio non-AP MLD. One exception is that, when the single-radio non-AP MLD enables an EMLSR mode, the AP MLD can establish a concurrent TWT agreement with that single-radio non-AP MLD, in which case only one link may be used for data frame exchange with the AP MLD. Thus, how to establish concurrent TWT agreements while accommodating EMLSR remains an issue to be addressed. Therefore, there is a need for a solution of EHT EMLSR TWT operation in wireless communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to EHT EMLSR TWT operation in wireless communications. It is believed that, under various proposed schemes in accordance with the present disclosure, issue(s) described herein may be addressed.

In one aspect, a method may involve a processor of a non-AP MLD enabling an EMLSR mode. The method may also involve the processor establishing one or more TWT agreements with an AP MLD on a first link and a second link of multiple links such that data exchange between a first station (STA) affiliated with the non-AP MLD and a first AP affiliated with the AP MLD occurs on the first link during a TWT SP while an EMLSR mode operation is performed on the second link.

In another aspect, an apparatus may include a transceiver configured to communicate wirelessly and a processor coupled to the transceiver. The processor may, as a non-AP MLD, enable an EMLSR mode. The processor may also establish one or more TWT agreements with an AP MLD on a first link and a second link of multiple links such that data exchange between a first STA affiliated with the non-AP MLD and a first AP affiliated with the AP MLD occurs on the first link during a TWT SP while an EMLSR mode operation is performed on the second link.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5$^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 6 is a diagram of an example design in accordance with an implementation of the present disclosure.

FIG. 9 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to EHT EMLSR TWT operation in wireless communications. According to the present disclosure, a number of possible solutions may be implemented separately or jointly. That is, although these possible solutions may be described below separately, two or more of these possible solutions may be implemented in one combination or another.

Figure 1:
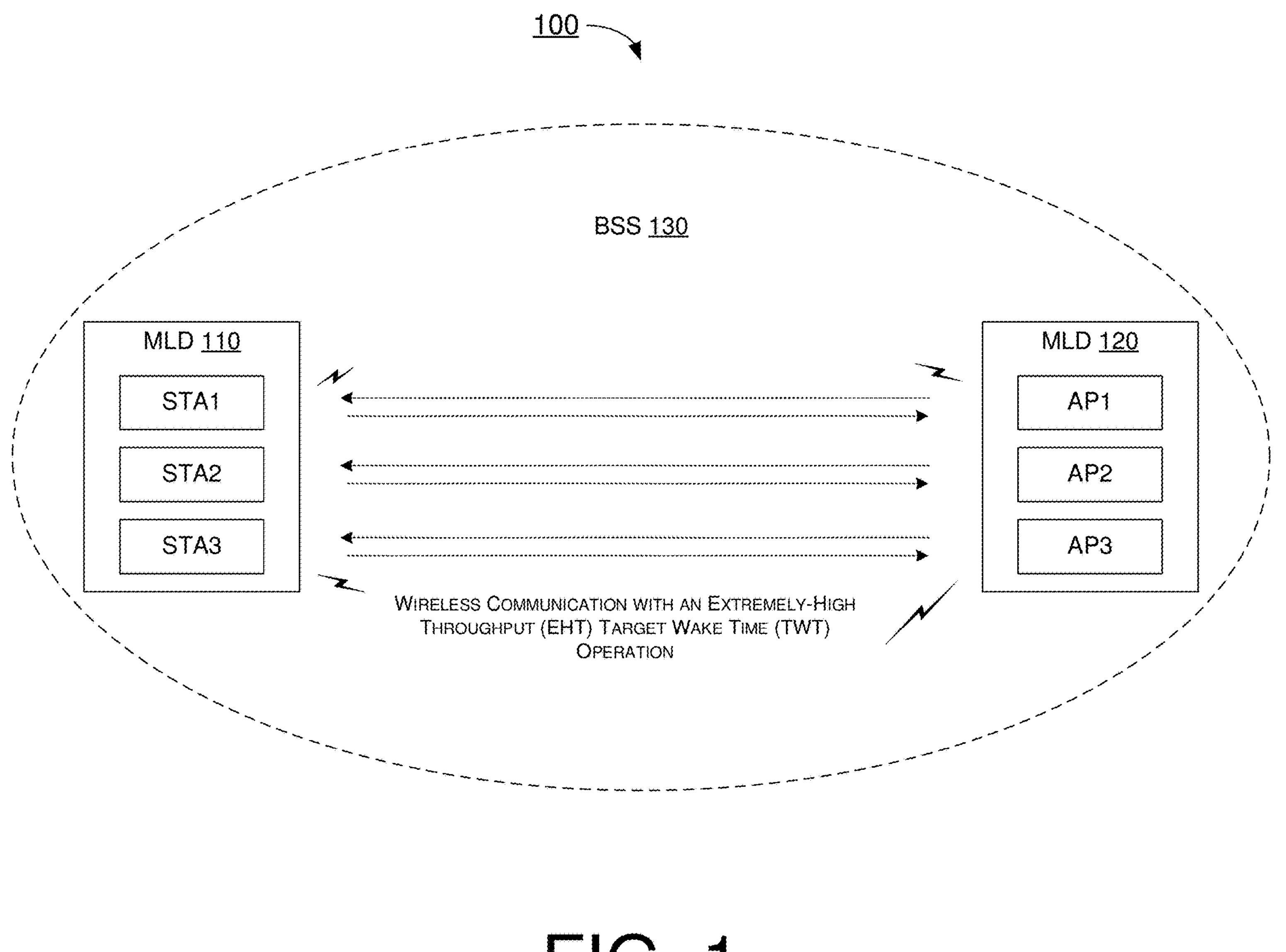
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 9 illustrate examples of implementation of various proposed schemes in network environment 100 in accordance with the present disclosure. The following description of various proposed schemes is provided with reference to FIG. 1~FIG. 9.

Referring to FIG. 1, network environment 100 may involve at least a first MLD, or MLD 110, and a second MLD, or MLD 120, communicating wirelessly with each other in a basic service set (BSS) 130 in accordance with one or more IEEE 802.11 standards (e.g., IEEE 802.11 be and beyond). Each STA of multiple STAs affiliated with MLD 110 may function as a non-AP STA, and each STA of multiple STAs affiliated with MLD 120 may function as an AP STA. That is, in the example shown in FIG. 1, MLD 110 may be non-AP MLD (herein interchangeably referred to as "STA MLD") and MLD 120 may be an AP MLD, although each of MLD 110 and MLD 120 may be an AP MLD or a STA MLD in various implementations. For simplicity and illustrative purposes without limiting the scope of the present disclosure, in FIG. 1, MLD 110 is shown to have three STAs ("STA1", "STA2" and "STA3" affiliated therewith) and MLD 120 is shown to have three APs ("AP1", "AP2" and "AP3" affiliated therewith), although in actual implementations the number of affiliated STAs/APs may be the same different (e.g., two instead of three). Moreover, each of MLD 110 and MLD 120 may be configured to utilize various schemes of EHT EMLSR TWT operation in wireless communications in accordance with various proposed schemes, as described below. It is noteworthy that, while the various proposed schemes may be individually or separately described below, in actual implementations each of the proposed schemes may be utilized individually or separately. Alternatively, some or all of the proposed schemes may be utilized jointly.

In an EMLSR procedure, a non-AP MLD may operate in the EMLSR mode on a specified set of enabled links between the non-AP MLD and its associated AP MLD. The specified set of the enabled links on which the EMLSR mode is applied is herein referred to as EMLSR links. The EMLSR links may be indicated in an EMLSR Link ID Bitmap subfield of an EML Control field of an EML Operating Mode Notification frame by setting the bit positions of the EMLSR Link ID Bitmap subfield to 1. For the EMLSR mode enabled in a single-radio non-AP MLD, the STA(s) affiliated with the non-AP MLD that operates on the link(s) corresponding to the bit position(s) of the EMLSR Link ID Bitmap subfield set to 0 may be in doze state if a STA affiliated with the non-AP MLD that operates on one of the EMLSR links is in an awake state. An MLD with dot11EHTEMLSROptionImplemented equal to true may set an Enhanced Multi-Link (EML) Capabilities Present subfield to 1 and may set an EMLSR Support subfield of a Common Info field of a Basic Multi-Link element to 1 in all Management frames that include the Basic Multi-Link element, except for Authentication frames. An MLD with dot11EHTEMLSROptionImplemented equal to false and dot11EHTEMLMROptionImplemented equal to true may set the Common Info field of the Basic Multi-Link element to 1 and may set the EMLSR Support subfield of the EML Capabilities subfield to 0. An MLD with dot11EHTEMLSROptionImplemented equal to false and dot11EHTEMLMROptionImplemented equal to false may set the EML Capabilities Present subfield to 0. The Basic Multi-Link element may be contained in or as part of a physical-layer protocol data unit (PPDU) transmitted by the MLD.

When a non-AP MLD with dot11EHTEMLSROptionImplemented equal to true intends to operate in the EMLSR mode on the EMLSR links, a STA affiliated with the non-AP MLD may transmit an EML Operating Mode Notification frame with the EMLSR Mode subfield of the EML Control field of the frame set to 1 to an AP affiliated with an AP MLD with dot11EHTEMLSROptionImplemented equal to true. An AP affiliated with the AP MLD that received the EML Operating Mode Notification frame from the STA affiliated with the non-AP MLD may transmit an EML Operating Mode Notification frame to one of the STAs affiliated with the non-AP MLD within the timeout interval indicated in the Transition Timeout subfield in the EML Capabilities subfield of the Basic Multi-Link element starting at the end of a PPDU transmitted by the AP affiliated with the AP MLD as an acknowledgement to the EML Operating Mode Notification frame transmitted by the STA affiliated with the non-AP MLD. After the successful transmission of the EML Operating Mode Notification frame on one of the EMLSR links by the STA affiliated with the non-AP MLD, the non-AP MLD may operate in the EMLSR mode and the STAs on the other links of the EMLSR links may transition to an active mode after the transition delay indicated in the Transition Timeout subfield in the EML Capabilities subfield of the Basic Multi-Link element or immediately after receiving an EML Operating Mode Notification frame from one of the APs operating on the EMLSR links and affiliated with the AP MLD. A STA on one of the other links of the EMLSR links may not transmit a frame with the Power Management subfield set to 1 before receiving the EML Operating Mode Notification frame from the AP affiliated with the AP MLD or before the end of the timeout interval.

When a non-AP MLD with dot11EHTEMLSROptionImplemented equal to true intends to disable the EMLSR mode, a STA affiliated with the non-AP MLD may transmit an EML Operating Mode Notification frame with the EMLSR Mode subfield of the EML Control field of the frame set to 0 to an AP affiliated with an AP MLD with dot11EHTEMLSROptionImplemented equal to true. An AP affiliated with the AP MLD that received the EML Operating Mode Notification frame from the STA affiliated with the non-AP MLD may transmit an EML Operating Mode Notification frame to one of the STAs affiliated with the non-AP MLD within the timeout interval indicated in the Transition Timeout subfield in the EML Capabilities subfield of the Basic Multi-Link element starting at the end of the PPDU transmitted by the AP affiliated with the AP MLD as an acknowledgement to the EML Operating Mode Notification frame transmitted by the STA affiliated with the non-AP MLD. After the successful transmission of the EML Operating Mode Notification frame on one of the EMLSR links by the STA affiliated with the non-AP MLD, the non-AP MLD may disable the EMLSR mode and the STAs on the other links of the EMLSR links may transition to power save mode after the transition delay indicated in the Transition Timeout subfield in the EML Capabilities subfield of the Basic Multi-Link element or immediately after receiving an EML Operating Mode Notification frame from one of the APs operating on the EMLSR links and affiliated with the AP MLD. A STA on one of the other links of the EMLSR links may not transmit a frame with the Power Management subfield set to 0 before receiving the EML Operating Mode Notification frame from the AP affiliated with the AP MLD or before the end of the timeout interval.

When a non-AP MLD is operating in the EMLSR mode with an AP MLD supporting the EMLSR mode, a number of conditions may apply. For instance, the non-AP MLD may be able to listen on the EMLSR links, by having its affiliated STA(s) corresponding to those links in awake state. The listening operation may include clear channel assessment (CCA) and receiving the initial Control frame of frame exchanges that is initiated by the AP MLD. The initial Control frame of frame changes may be sent in the OFDM PPDU or non-HT duplicate PPDU format using a rate of 6 Mbps, 12 Mbps, or 24 Mbps. Also, the initial Control frame may be a multi-user request-to-send (MU-RTS) Trigger frame or a buffer status report poll (BSRP) Trigger frame. Reception of MU-RTS and BSRP Trigger frames is mandatory for a non-AP MLD that is in the EMLSR mode. The number of spatial streams for the response to the BSRP Trigger frame may be limited to one. Moreover, the non-AP MLD may indicate the delay time duration in the EMLSR Padding Delay subfield of the EML Capabilities subfield in the Common Info field of the Basic Multi-Link element. Also, an AP affiliated with the AP MLD initiating frame exchanges with the non-AP MLD on one of the EMLSR links may begin the frame exchanges by transmitting the initial Control frame to the non-AP MLD with the limitations specified above. Moreover, after receiving the initial Control frame of frame exchanges, a STA affiliated with the non-AP MLD that was listening on the corresponding link may be able to transmit or receive frames on the link in which the initial Control frame was received and may not transmit or receive on the other EMLSR link(s) until the end of the frame exchanges. Subject to its spatial stream capabilities, operation mode, and link switch delay, the STA affiliated with the non-AP MLD may be capable of receiving a PPDU that is sent using more than one spatial stream on the link in which the initial Control frame was received after a short inter-frame space (SIFS) of the end of its response frame transmission solicited by the initial Control frame. During the frame exchanges, the other AP(s) affiliated with the AP MLD may not transmit frames to the other STA(s) affiliated with the non-AP MLD on the other EMLSR link(s).

When a non-AP MLD is operating in the EMLSR mode with an AP MLD supporting the EMLSR mode, the non-AP MLD may be switched back to the listening operation on the EMLSR links after the time indicated in the EMLSR Transition Delay subfield of the EML Capabilities subfield in the Common Info field of the Basic Multi-Link element if any of certain conditions is met and this is defined as the end of the frame exchanges. One condition may be that the medium access control (MAC) layer of the STA affiliated with the non-AP MLD that received the initial Control frame does not receive a PHY-RXSTART.indication primitive during a timeout interval of aSIFSTime+aSlotTime+aRxPHYStartDelay starting at the end of the PPDU transmitted by the STA of the non-AP MLD as a response to the most recently received frame from the AP affiliated with the AP MLD or starting at the end of the reception of the PPDU containing a frame for the STA from the AP affiliated with the AP MLD that does not require immediate acknowledgement. Another condition may be that the MAC layer of the STA affiliated with the non-AP MLD that received the initial Control frame receives a PHY-RXSTART.indication primitive during a timeout interval of aSIFSTime+aSlot-Time+aRxPHYStartDelay starting at the end of the PPDU transmitted by the STA of the non-AP MLD as a response to the most recently received frame from the AP affiliated with the AP MLD or starting at the end of the reception of the PPDU containing a frame for the STA from the AP affiliated with the AP MLD that does not require immediate acknowledgement and the STA affiliated with the non-AP MLD does not detect, within the PPDU corresponding to the PHY-RXSTART.indication any of the following frames: (a) an individually addressed frame with the RA equal to the MAC address of the STA affiliated with the non-AP MLD, (b) a Trigger frame that has one of the User Info fields addressed to the STA affiliated with the non-AP MLD, (c) a clear-to-send (CTS)-to-self frame with the receiver address (RA) equal to the MAC address of the AP affiliated with the AP MLD, (d) a Multi-STA block acknowledgement (BlockAck) frame that has one of the Per AID TID Info fields addressed to the STA affiliated with the non-AP MLD, and (e) a null-data packet (NDP) Announcement frame that has one of the STA Info fields addressed to the STA affiliated with the non-AP MLD. A third condition may be that the STA affiliated with the non-AP MLD that received the initial Control frame does not respond to the most recently received frame from the AP affiliated with the AP MLD that requires immediate response after a SIFS.

When a non-AP MLD is operating in the EMLSR mode with an AP MLD supporting the EMLSR mode, certain conditions apply. For instance, the AP affiliated with the AP MLD may transmit, before the TXNAV timer expires, another initial Control frame addressed to the STA affiliated with the non-AP MLD if the AP intends to continue the frame exchanges with the STA and did not receive the response frame from this STA for the most recently transmitted frame that requires an immediate response after a SIFS. Additionally, or alternatively, when a STA of the non-AP MLD initiates a transmission opportunity (TXOP), the non-AP MLD may switch back to the listening operation on the EMLSR links after the time duration indicated in the EMLSR Transition Delay subfield after the end of the TXOP. Moreover, only one STA affiliated with the non-AP MLD that is operating on one of the EMLSR links may initiate frame exchanges with the AP MLD.

Figure 2:
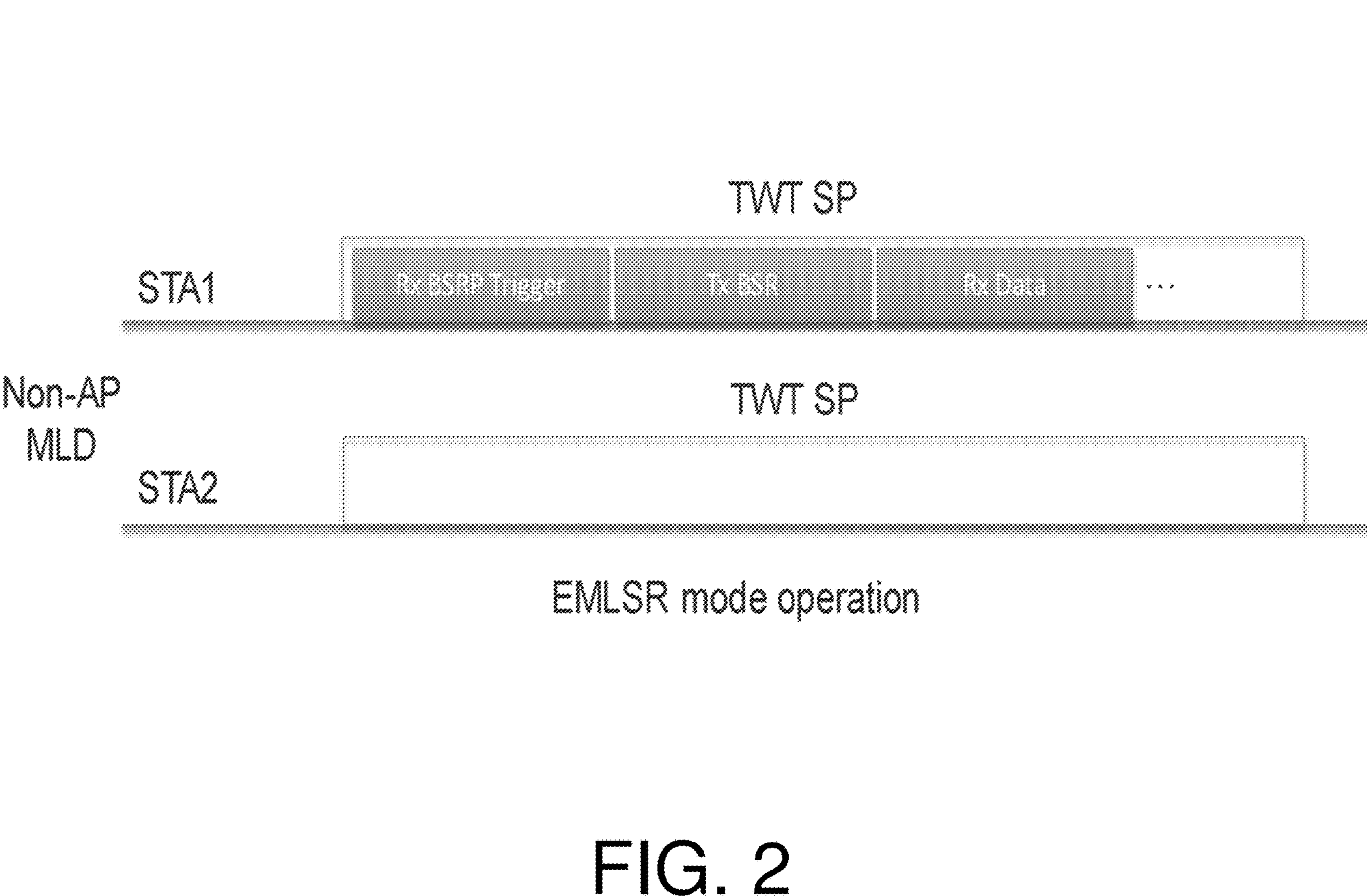
FIG. 2 is a diagram of an example scenario in accordance with an implementation of the present disclosure.

FIG. 2 illustrates an example scenario 200 in which various proposed schemes in accordance with the present disclosure may be implemented. Referring to FIG. 2, TWT agreements may be concurrently established on more than one link between an AP MLD and a non-AP MLD, with TWT SPs of the TWT agreements on two links overlapping in time. The AP MLD may not establish concurrent TWT agreement for a single-radio non-AP MLD. However, when the single-radio non-AP MLD enables an EMLSR mode, the AP MLD may establish the concurrent TWT agreement with the single-radio non-AP MLD.

Figure 3:
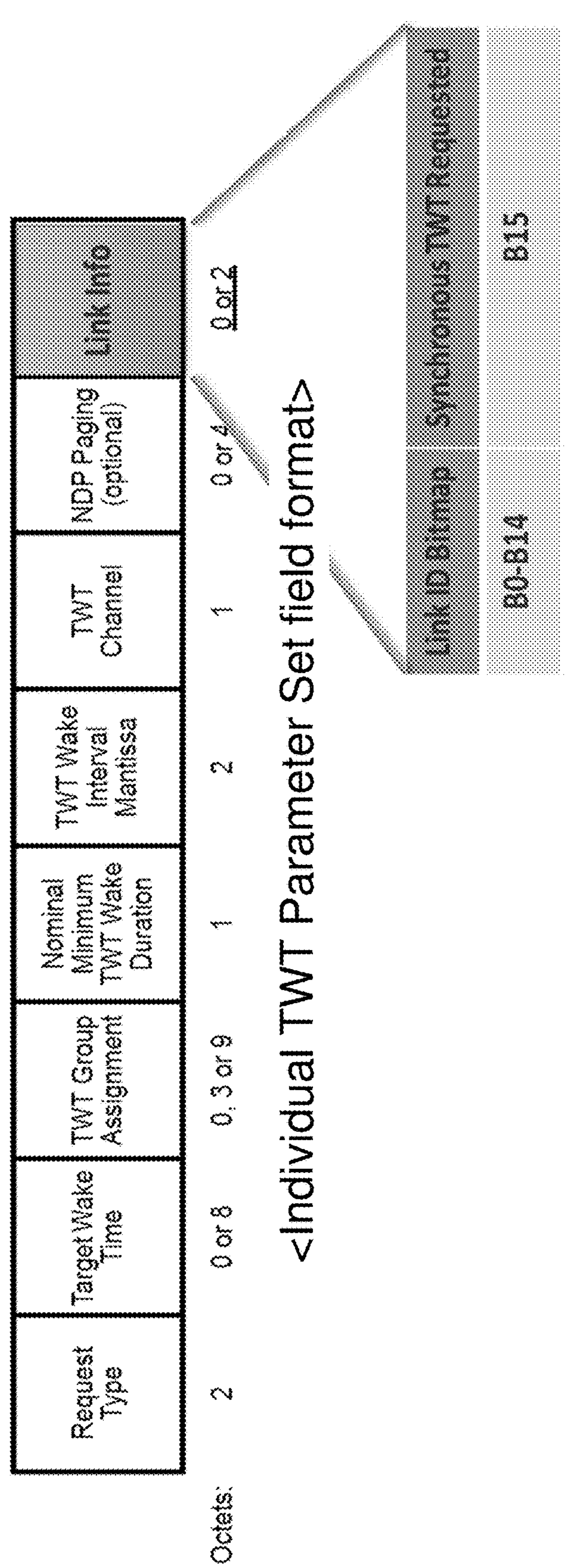
FIG. 3 is a diagram of an example design in accordance with an implementation of the present disclosure.

FIG. 3 illustrates an example design 300 under a proposed scheme in accordance with the present disclosure. Design 300 may pertain to the format of an individual TWT Parameter Set field under the proposed scheme. Referring to FIG. 3, the TWT Parameter Set field may contain a number of subfields, including an optional Link Info subfield. The length of the Link Info subfield may be 0 or 2 octets. The Link Info subfield may include a Link identifier (ID) Bitmap subfield (e.g., 15 bits of B0-B14) and a Synchronous TWT Requested subfield (e.g., 1 bit of B15).

Under a proposed scheme in accordance with the present disclosure with respect to TWT agreement, a STA affiliated with an MLD may indicate the link(s) that are requested for setting up TWT agreement(s) in the Link ID Bitmap subfield, if present, of a TWT element in the TWT request. In case that only one link is indicated in the Link ID Bitmap subfield of the TWT element, then a single TWT agreement may be requested on behalf of the STA affiliated with the same MLD and that is operating on the indicated link. The Target Wake Time field of the TWT element may be in reference to the timing synchronization function (TSF) time of the link indicated by the TWT element. Moreover, a STA affiliated with a peer MLD (e.g., an AP STA affiliated with an AP MLD) that receives a TWT request that contains a Link ID Bitmap subfield in a TWT element may respond with a TWT response that may indicate the link(s) in the Link ID Bitmap field of a TWT element. The link(s), if present, in the TWT element in the TWT response, may be the same as the link(s) indicated in the TWT element of the soliciting TWT request.

Under a proposed scheme in accordance with the present disclosure with respect to TWT agreement, during the negotiation of TWT agreements, a TWT requesting STA affiliated with an MLD and a TWT responding STA affiliated with another MLD may include multiple TWT elements where each of the Link ID Bitmap subfields in each TWT element may indicate different link(s) in the same TWT Setup frame. The TWT parameters provided by each TWT element may be applied and be in reference to the respective link that is indicated in the TWT element. Furthermore, a STA affiliated with a peer MLD that receives a TWT request that contains multiple TWT elements may respond with a TWT response that indicate the links in the Link ID Bitmap field of a TWT element. The links in the TWT element in the TWT response may be the same as the links indicated in the TWT element of the soliciting TWT request.

Figure 4:
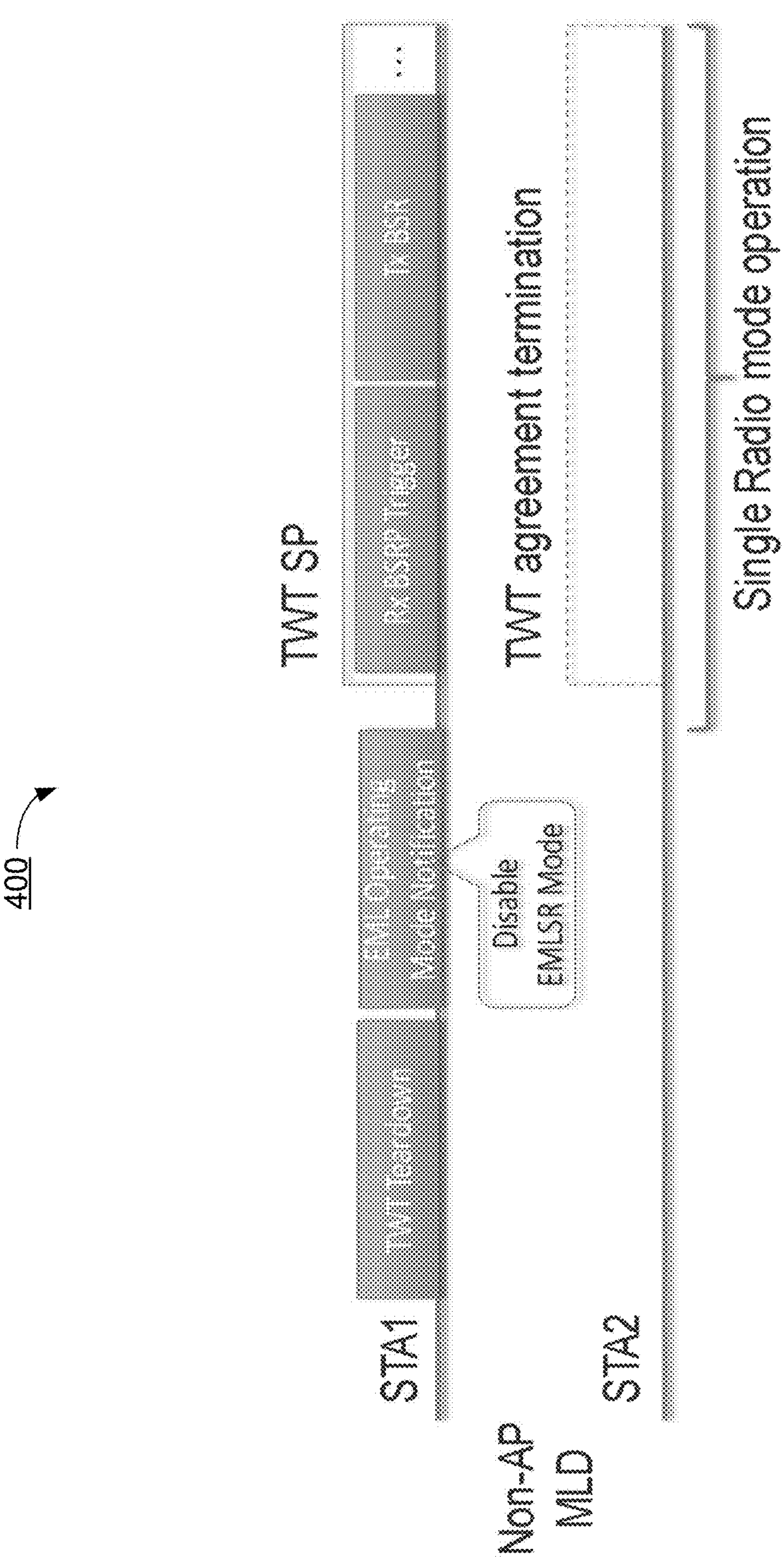
FIG. 4 is a diagram of an example scenario in accordance with an implementation of the present disclosure.

FIG. 4 illustrates an example scenario 400 under a proposed scheme in accordance with the present disclosure. In scenario 400, for a non-AP MLD that enabled an EMLSR mode and established a concurrent TWT agreement on multiple links, a TWT Teardown frame may be sent to terminate the concurrent TWT agreement before switching from the EMLSR mode to a Single Radio mode. Referring to FIG. 4, the TWT Teardown frame is transmitted by STA1 to terminate the TWT agreement of the STA2. In consequence, the TWT agreement exists only for a single link (e.g., the link on which STA1 operates), and there is not concurrent TWT agreement.

Figure 5:
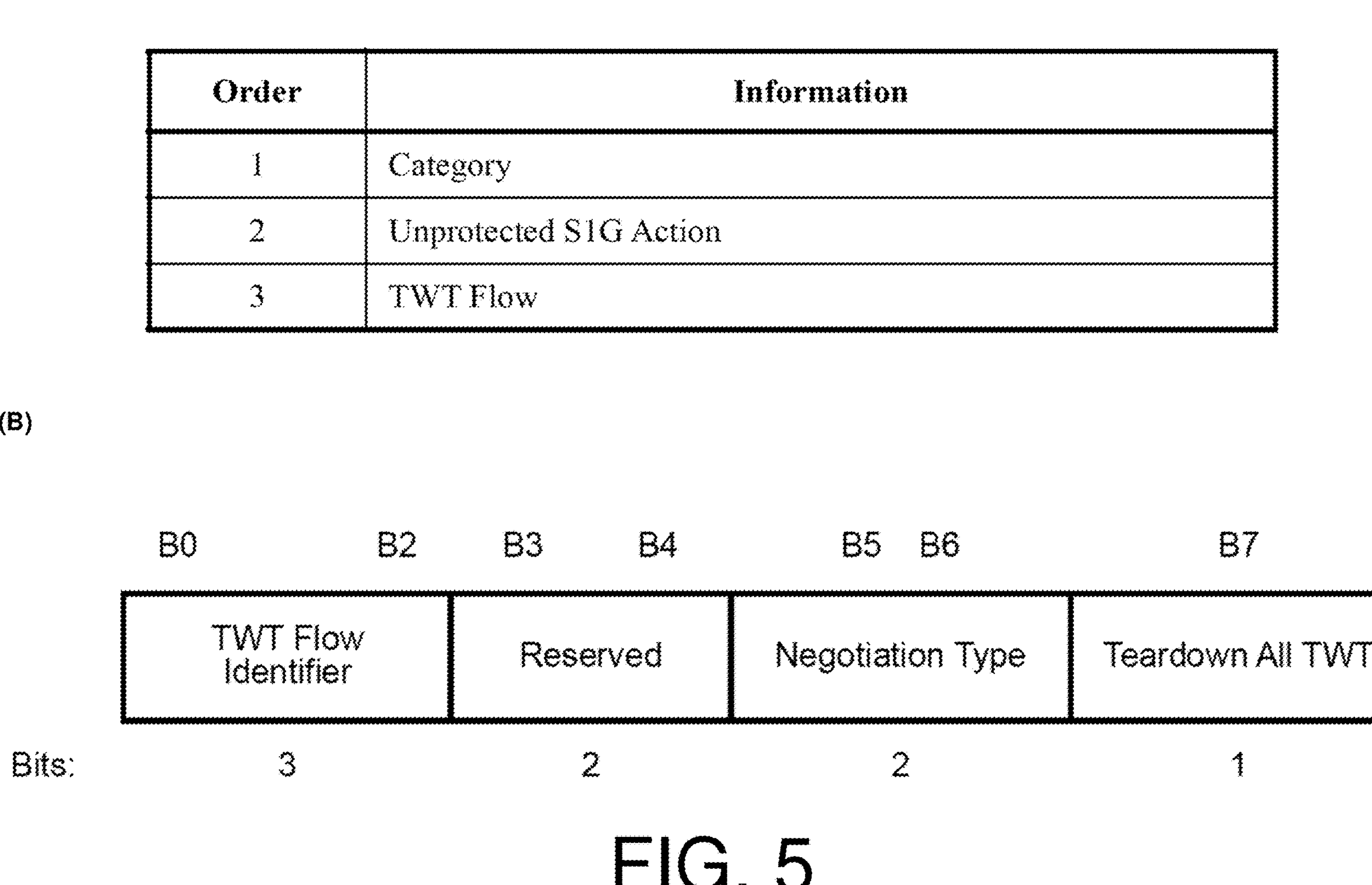
FIG. 5 is a diagram of an example design in accordance with an implementation of the present disclosure.

FIG. 5 illustrates an example design 500 under a proposed scheme in accordance with the present disclosure. Design 500 may pertain to field formats for EMLSR TWT operation under the proposed scheme. Part (A) of FIG. 5 shows an example format of an Action field of a TWT Teardown frame. Part (B) of FIG. 5 shows an example format of a TWT Flow field in an event that the Negotiation Type subfield is 0 or 1.

FIG. 6 illustrates an example design 600 under a proposed scheme in accordance with the present disclosure. Design 600 may pertain to a format of a TWT Flow field. Under the proposed scheme with respect to EMLSR TWT operation, the Link ID Bitmap field may be present in case that the Link ID Bitmap Present field is equal to 1; otherwise, the Link ID Bitmap field may not be present. Moreover, the Link ID Bitmap subfield may indicate the links to which the TWT Teardown frame sent by a STA affiliated with an MLD applies. A value of 1 in bit position i of the Link ID Bitmap subfield may indicate that the link to which the TWT Teardown frame sent by a STA affiliated with an MLD applies. A value of 0 in bit position i of the Link Bit map subfield may indicate that the link associated with the link ID i is not the link to which the TWT Teardown frame sent by a STA affiliated with an MLD applies. Furthermore, the Teardown All TWT field may be set to 1 by a STA to indicate that the TWT Teardown frame tears down all TWTs; otherwise, it may be set to 0.

Under a proposed scheme in accordance with the present disclosure with respect to TWT operation, a STA affiliated with an MLD may negotiate individual TWT agreements with another STA affiliated with another MLD except for certain scenarios. In a first scenario, the STA affiliated with the MLD may indicate the link(s) that are requested for setting up TWT agreement(s) in the Link ID Bitmap subfield, if present, of a TWT element in the TWT request. In case that only one link is indicated in the Link ID Bitmap subfield of the TWT element, then a single TWT agreement may be requested on behalf of the STA affiliated with the same MLD and that is operating on the indicated link. Moreover, the Target Wake Time field of the TWT element may be in reference to the TSF time of the link indicated by the TWT element. In a second scenario, the STA affiliated with the MLD may indicate the link(s) that are requested for tearing down TWT agreement(s) in the Link ID Bitmap subfield, if present, of a TWT Teardown frame. In case that only one link is indicated in the Link ID Bitmap subfield of the TWT Teardown frame, then a single TWT teardown may be requested on behalf of the STA affiliated with the same MLD and that is operating on the indicated link.

Figure 7:
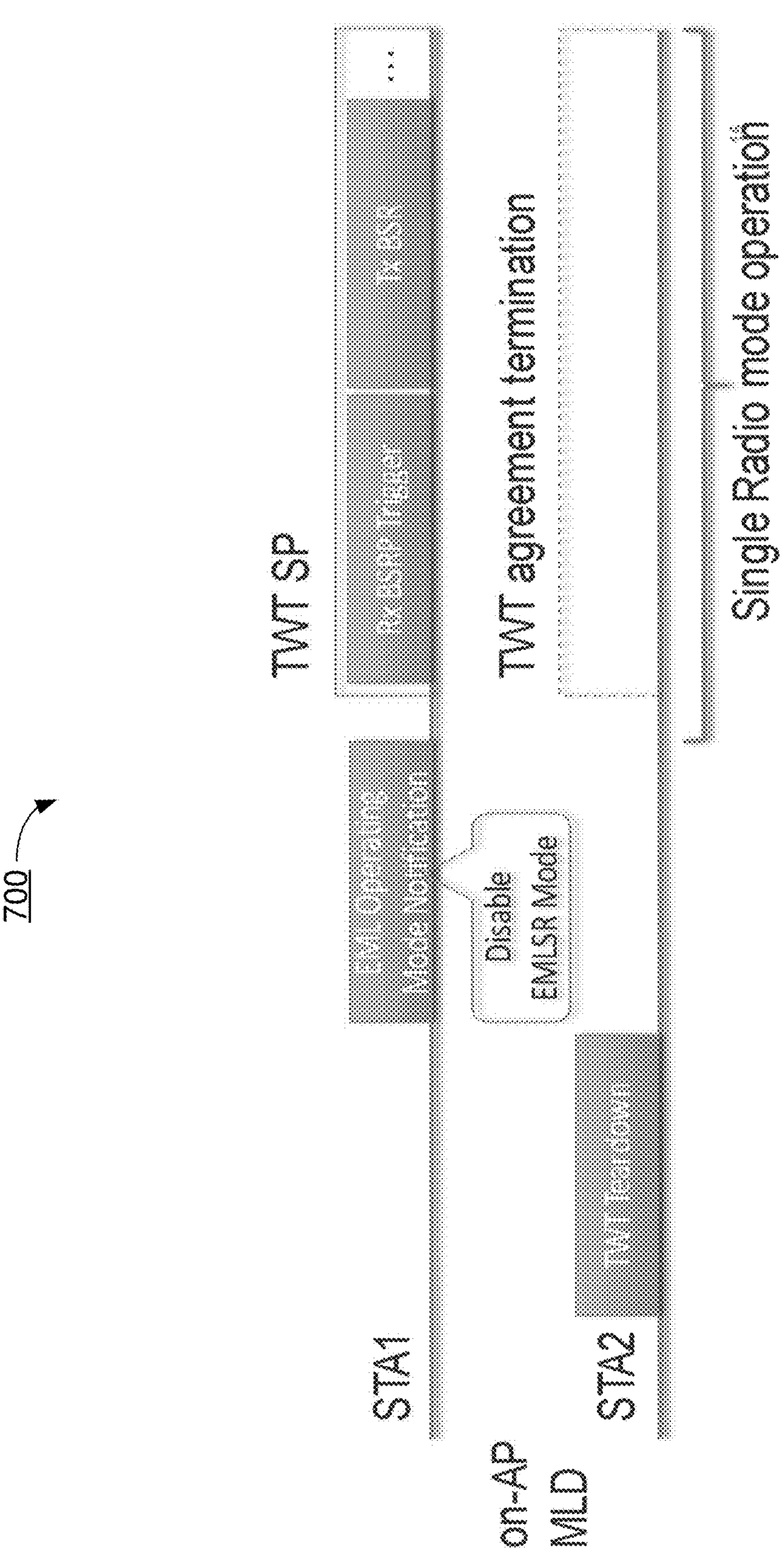
FIG. 7 is a diagram of an example scenario in accordance with an implementation of the present disclosure.

FIG. 7 illustrates an example scenario 700 under a proposed scheme with respect to TWT operation in accordance with the present disclosure. In scenario 700, a STA affiliated with an MLD may negotiate individual TWT agreements with another STA affiliated with another MLD except for certain scenarios. In a first scenario, in case that the Link ID Bitmap subfield is not present in a TWT Teardown frame, the MLD may send a TWT Teardown frame on the link that it requests for tearing down TWT agreement(s), as shown in FIG. 7. In a second scenario, in case that the MLD intends to terminate all TWTs established on all links, the MLD may set all bit values of bit positions for all links that MLD had set up in the Link ID Bitmap subfield to 1.

Under a proposed scheme in accordance with the present disclosure with respect to negotiation of a wake target beacon transmission time (TBTT) and a wake interval, a TBTT scheduled STA that intends to operate in a power-save mode may transmit a TWT request to a TBTT scheduling AP that identifies the wake TBTT of the first Beacon frame and the wake interval between subsequent Beacon frames the STA intends to receive. The TWT request may contain certain pieces of information such as, for example and without limitation: (a) the Negotiation Type subfield equal to 1 and the TWT Setup Command field to Suggest TWT or Demand TWT; (b) the requested first wake TBTT in the Target Wake Time field; (c) the requested wake interval between consecutive TBTTs in the TWT Wake Interval Mantissa and TWT Wake Interval Exponent fields; (d) the requested TBTT wake duration in the Nominal Minimum TWT Wake Duration field; and (e) all other fields in the TWT element are reserved. Under the proposed scheme, a TBTT scheduling AP that receives a TWT request from a STA whose value of the Negotiation Type subfield is 1 may respond with a TWT response that contains either Accept TWT, Alternate TWT, or Reject TWT in the TWT Setup Command field. In the case of an Accept TWT, the TWT Setup Command field may also contain certain pieces of information such as, for example and without limitation: (a) the Negotiation Type subfield equal to 1; (b) the allocated first wake TBTT in the Target Wake Time field; (c) the allocated wake interval between consecutive TBTTs in the TWT Wake Interval Mantissa and TWT Wake Interval Exponent fields; (d) the allocated TBTT wake duration in the Nominal Minimum TWT Wake Duration field; and (e) all other fields in the TWT element are reserved.

Under the proposed scheme with respect to negotiation of wake TBTT and wake interval, after successfully completing the negotiation, the TBTT scheduled STA may enter a doze state until its TSF matches the next negotiated wake TBTT, provided that the STA is in a power-save mode and no other condition requires the STA to remain awake. The TBTT scheduled STA may be in the awake state to listen to Beacon frames transmitted at negotiated wake TBTTs and may operate accordingly. In an event that the TBTT scheduled STA receives a Beacon frame from the TBTT scheduling AP at or after TBTT, the TBTT scheduled STA may enter the doze state until the next wake TBTT in case there is no other condition requiring the STA to remain awake. The TBTT scheduled STA may enter the doze state after a nominal minimum TBTT wake duration time has elapsed from the TBTT start time in case there is no other condition requiring the STA to remain awake. A given STA that is a party to an established wake TBTT agreement may tear down the wake TBTT agreement by following the tear down procedure described herein and by setting the Negotiation Type subfield to 1 in the TWT Teardown frame.

Under a proposed scheme in accordance with the present disclosure with respect to EMLSR TBTT negotiation, a STA affiliated with a non-AP MLD operating in an EMLSR mode may negotiate a wake TBTT and a wake interval with an AP affiliated with an AP MLD. When a first STA affiliated with the non-AP MLD negotiates a wake TBTT and wake interval with a first AP affiliated with the AP MLD to receive Beacon frames on one of one or more EMLSR links, certain operations may be performed or otherwise carried out. In a first operation, a second AP affiliated with the AP MLD may end frame exchanges initiated with a second STA affiliated with the non-AP MLD on another EMLSR link at least an EMLSR transition delay, as indicated in an EMLSR Transition Delay subfield, before the first AP affiliated with the same AP MLD schedules for transmission of Beacon frame at the negotiated TBTT. In a second operation, a second STA affiliated with the non-AP MLD that initiates frame exchanges on another EMLSR link may end a TXOP at least an EMLSR transition delay, as indicated in the EMLSR Transition Delay subfield, before the first STA affiliated with the same non-AP MLD receives the Beacon frame scheduled at the negotiated TBTT.

Under a proposed scheme in accordance with the present disclosure with respect to alignment of TWT agreements across multiple links, a STA affiliated with an MLD with dot11AlignedTWTOptionImplemented equal to true that supports reception of a TWT setup frame that requests an alignment or nonalignment of the TWTs across multiple links may set the Aligned TWT Support subfield in the Common Info field of the Basic Multi-Link element it transmits to 1; otherwise, the STA may set it to 0. Additionally, a TWT requesting STA may transmit a TWT request containing TWT element(s) that request an alignment or nonalignment of the TWTs across multiple links to a TWT responding STA that set the Aligned TWT Support subfield in the Common Info field of the Basic Multi-Link element it transmits to 1. Moreover, in case that the TWT requesting STA intends to request an alignment of the TWTs across the setup links that point to start times that are aligned across these links and have the same TWT parameters on these links, and the STA includes only one TWT element for these links in the TWT request, then the TWT element may carry the Aligned TWT Bitmap subfield that indicates the link(s) that have been requested to have TWTs that are aligned with the TWTs of the link indicated in the Link ID Bitmap subfield. The bit corresponding to the link indicated in the Link ID Bitmap subfield shall be set to 0 in the Aligned TWT Bitmap subfield. The TWT responding STA that receives a TWT request that contains the Aligned TWT Bitmap subfield may respond with a TWT response frame that contains an Aligned TWT Bitmap subfield that has the same value as the Aligned TWT Bitmap subfield of the TWT request.

Moreover, a TWT requesting STA that sends a TWT request containing multiple TWT elements for multiple links may request an alignment and overlap of the TWTs SPs across the links by setting the TWT fields of each of the TWT elements that correspond to each of these links to the TSF times, of the respective links, at which the corresponding STAs affiliated with the MLD request to wake. The TWT requesting STA may ensure that the TWT wake intervals obtained from these TWT elements are multiples of the same common denominator. A TWT responding STA that receives the TWT request and that accepts the alignment and overlap of TWTs across these set of links may ensure that the TWT fields of the TWT elements that correspond to these links are set to the TSF times, of the respective links, but point to start times that are aligned across these links and that the TWT wake intervals indicated in the TWT elements are multiples of the same common denominator.

Furthermore, a TWT requesting STA that sends a TWT request containing multiple TWT elements for multiple links may request a nonalignment of TWTs SPs across the links by setting the TWT field of the TWT elements that correspond to each of these links to the TSF times, of the respective links, at which the corresponding STAs affiliated with the MLD request to wake. The TWT requesting STA may ensure that the TWT wake intervals obtained from these TWT elements are multiples of the same common denominator and that none of the requested TWTs occur during the requested TWT SPs of any of the other links. A TWT responding STA that receives the TWT request and that accepts the nonalignment TWT SPs across the set of links may ensure that the TWT fields of the TWT elements that correspond to these links are set to the TSF times, of the respective links, but point to start times that do not overlap with TWT SPs of accepted TWT agreements of any other links and that the TWT wake intervals indicated in the TWT elements are multiples of the same common denominator.

It is note worthy that, in case that the TWT wake intervals of any two links that are included in a TWT request are multiples of the same common denominator and the TWTs of these two links point to aligned start times, then aligned TWT SPs are being negotiated. In case that the TWT wake intervals of any two links that are included in a TWT request are multiples of the same common denominator and the TWTs of these two links do not point to aligned start times, then nonaligned TWT SPs are being negotiated. Also, the TWT request and the TWT response may be sent after (re)association.

Illustrative Implementations

Figure 8:
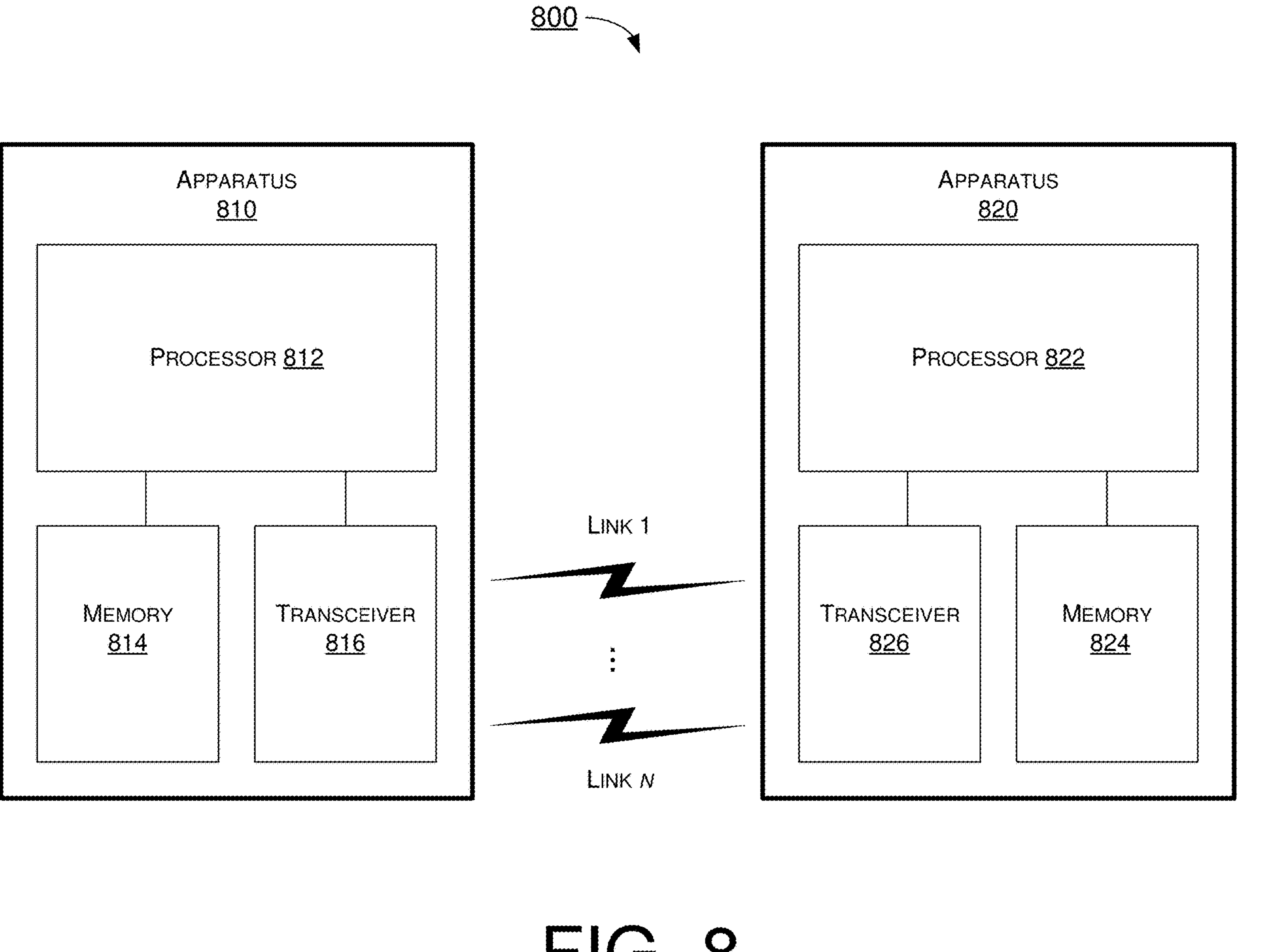
FIG. 8 is a block diagram of an example communication system in accordance with an implementation of the present disclosure.

FIG. 8 illustrates an example system 800 having at least an example apparatus 810 and an example apparatus 820 in accordance with an implementation of the present disclosure. Each of apparatus 810 and apparatus 820 may perform various functions to implement schemes, techniques, processes and methods described herein pertaining to EHT EMLSR TWT operation in wireless communications, including the various schemes described above with respect to various proposed designs, concepts, schemes, systems and methods described above as well as processes described below. For instance, apparatus 810 may be an example implementation of MLD 110 or MLD 120, and apparatus 820 may be an example implementation of MLD 120.

Each of apparatus 810 and apparatus 820 may be a part of an electronic apparatus such as, for example and without limitation, a portable or mobile apparatus, a wearable apparatus, a wireless communication apparatus or a computing apparatus. For instance, each of apparatus 810 and apparatus 820 may be implemented in a smartphone, a smart watch, a personal digital assistant, a digital camera, or a computing equipment such as a tablet computer, a laptop computer or a notebook computer. Each of apparatus 810 and apparatus 820 may also be a part of a machine type apparatus, which may be an IoT apparatus such as an immobile or a stationary apparatus, a home apparatus, a wire communication apparatus or a computing apparatus. For instance, each of apparatus 810 and apparatus 820 may be implemented in a smart thermostat, a smart fridge, a smart door lock, a wireless speaker or a home control center. When implemented in or as a network apparatus, apparatus 810 and/or apparatus 820 may be implemented in a network node, such as an AP in a WLAN.

In some implementations, each of apparatus 810 and apparatus 820 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Each of apparatus 810 and apparatus 820 may include at least some of those components shown in FIG. 8 such as a processor 812 and a processor 822, respectively, for example. Each of apparatus 810 and apparatus 820 may further include one or more other components not pertinent to the proposed scheme of the present disclosure (e.g., internal power supply, display device and/or user interface device), and, thus, such component(s) of apparatus 810 and apparatus 820 are neither shown in FIG. 8 nor described below in the interest of simplicity and brevity.

In one aspect, each of processor 812 and processor 822 may be implemented in the form of one or more single-core processors, one or more multi-core processors, one or more RISC processors or one or more CISC processors. That is, even though a singular term "a processor" is used herein to refer to processor 812 and processor 822, each of processor 812 and processor 822 may include multiple processors in some implementations and a single processor in other implementations in accordance with the present disclosure. In another aspect, each of processor 812 and processor 822 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 812 and processor 822 is a special-purpose machine specifically designed, arranged and configured to perform specific tasks including those pertaining to EHT EMLSR TWT operation in wireless communications in accordance with various implementations of the present disclosure.

In some implementations, apparatus 810 may also include a transceiver 816 coupled to processor 812. Transceiver 816 may be capable of wirelessly transmitting and receiving data. In some implementations, apparatus 820 may also include a transceiver 826 coupled to processor 822. Transceiver 826 may include a transceiver capable of wirelessly transmitting and receiving data. Transceiver 816 of apparatus 810 and transceiver 826 of apparatus 820 may wirelessly communicate with each other over one or more of multiple links link 1-link N, with N being a positive integer greater than 1, such as a first link and a second link.

In some implementations, apparatus 810 may further include a memory 814 coupled to processor 812 and capable of being accessed by processor 812 and storing data therein. In some implementations, apparatus 820 may further include a memory 824 coupled to processor 822 and capable of being accessed by processor 822 and storing data therein. Each of memory 814 and memory 824 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 814 and memory 824 may include a type of read-only memory (ROM) such as mask ROM, programmable ROM (PROM), erasable programmable ROM (EPROM) and/or electrically erasable programmable ROM (EEPROM). Alternatively, or additionally, each of memory 814 and memory 824 may include a type of non-volatile random-access memory (NVRAM) such as flash memory, solid-state memory, ferroelectric RAM (FeRAM), magnetoresistive RAM (MRAM) and/or phase-change memory.

Each of apparatus 810 and apparatus 820 may be a communication entity capable of communicating with each other using various proposed schemes in accordance with the present disclosure. For illustrative purposes and without limitation, a description of capabilities of apparatus 810, as MLD 110 or MLD 120 which may be a non-AP MLD, and apparatus 820, as MLD 120 which may be an AP MLD, is provided below in the context of example process 900. It is noteworthy that, although the example implementations described below are provided in the context of WLAN, the same may be implemented in other types of networks.

Illustrative Processes

FIG. 9 illustrates an example process 900 in accordance with an implementation of the present disclosure. Process 900 may represent an aspect of implementing various proposed designs, concepts, schemes, systems and methods described above. More specifically, process 900 may represent an aspect of the proposed concepts and schemes pertaining to EHT EMLSR TWT operation in wireless communications in accordance with the present disclosure. Process 900 may include one or more operations, actions, or functions as illustrated by one or more of blocks 910 and 920. Although illustrated as discrete blocks, various blocks of process 900 may be divided into additional blocks, combined into fewer blocks, or eliminated, depending on the desired implementation. Moreover, the blocks/sub-blocks of process 900 may be executed in the order shown in FIG. 9 or, alternatively, in a different order. Furthermore, one or more of the blocks/sub-blocks of process 900 may be executed repeatedly or iteratively. Process 900 may be implemented by or in apparatus 810 and apparatus 820 as well as any variations thereof. Solely for illustrative purposes and without limiting the scope, process 900 is described below in the context of apparatus 810 as MLD 110 (e.g., a non-AP MLD) and apparatus 820 as MLD 120 (e.g., an AP MLD) of a wireless network such as a WLAN in accordance with one or more of IEEE 802.11 standards. Process 900 may begin at block 910.

At 910, process 900 may involve processor 812 of apparatus 810, as a non-AP MLD (e.g., MLD 110), enabling an EMLSR mode. Process 900 may proceed from 910 to 920.

At 920, process 900 may involve processor 812 establishing, via transceiver 816, one or more TWT agreements with an AP MLD (e.g., apparatus 820 as MLD 120) on a first link and a second link of multiple links such that data exchange between a first STA affiliated with the non-AP MLD and a first AP affiliated with the AP MLD occurs on the first link during a TWT SP while an EMLSR mode operation is performed on the second link.

In some implementations, in establishing the one or more TWT agreements, process 900 may involve processor 812 transmitting a TWT request. In such cases, a Link ID Bitmap subfield of a TWT element in the TWT request may indicate one or more links of the multiple links for which the one or more TWT agreements are requested to be established. Additionally, process 900 may involve processor 812 receiving a TWT response. In such cases, a Link ID Bitmap subfield of a TWT element in the TWT response may indicate the one or more links of the multiple links for which the one or more TWT agreements are requested to be established.

In some implementations, the one or more TWT agreements may include concurrent TWT agreements on the multiple links, and process 900 may involve processor 812 performing additional operations. For instance, process 900 may involve processor 812 transmitting, via transceiver 816, a TWT Teardown frame to terminate the concurrent TWT agreements. Moreover, process 900 may involve processor 812 switching from the EMLSR mode to a single-radio mode.

In some implementations, the TWT Teardown frame may contain a Link ID Bitmap subfield indicating one or more links to which the TWT Teardown frame applies. Alternatively, or additionally, the TWT Teardown frame may contain a Teardown All TWT subfield indicating whether or not the TWT Teardown frame applies to all of the multiple links on which the concurrent TWT agreements are established. In such cases, all bit values of a Link ID Bitmap subfield in the TWT Teardown frame may be set to 1 to terminate all TWT agreements established on all of the multiple links.

In some implementations, in transmitting the TWT Teardown frame, process 900 may involve processor 812 transmitting the TWT Teardown frame on one of the multiple links a respective TWT agreement of which is requested for tearing down. In such cases, the TWT Teardown frame may not contain a Link ID Bitmap subfield indicating one or more links to which the TWT teardown frame applies.

In some implementations, process 900 may involve processor 812 performing additional operations. For instance, process 900 may involve processor 812 negotiating, as the first STA and via transceiver 816, a wake TBTT and a wake interval with a second AP affiliated with the AP MLD. Moreover, process 900 may involve processor 812 receiving, via transceiver 816, one or more beacon frames on the second link. Furthermore, process 900 may involve processor 812 ending, as a second STA affiliated with the non-AP MLD and operating in the EMLSR mode on the second link, a TXOP on the second link before the first STA receives a beacon frame scheduled at the negotiated TBTT. In some implementations, in ending the TXOP, process 900 may involve processor 812 ending the TXOP at least an EMLSR transition delay before the first STA receives the beacon frame scheduled at the negotiated TBTT. Moreover, the EMLSR transition delay may be indicated in an EMLSR Transition Delay subfield of an EML Capabilities subfield in a Common Info field of a Basic Multi-Link element.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds 'true' for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the 'true' scope and spirit being indicated by the following claims.

What is claimed is:

1. A method, comprising:

enabling, by a processor of a non-access point (non-AP) multi-link device (MLD), an enhanced multi-link single-radio (EMLSR) mode by performing operations comprising:

establishing one or more target wake time (TWT) agreements comprising a concurrent TWT agreement with an access point (AP) MLD on a first link and a second link of multiple links such that data exchange between a first station (STA) affiliated with the non-AP MLD and a first AP affiliated with the AP MLD occurs on the first link during a TWT service period (SP) while an operation in the EMLSR mode is performed on the second link between the AP MLD and a second STA affiliated with the non-AP MLD; and switching from operating in the EMSLR mode to operating in a single radio mode on the second link responsive to the first STA transmitting a TWT Teardown frame on the first link to terminate the concurrent TWT agreement;

wherein, prior to switching from the EMLSR mode to the single radio mode, the non-AP MLD transmits the TWT Teardown frame that selectively applies to one or more links to terminate the concurrent TWT agreement on the multiple links.

2. The method of claim 1, wherein the establishing of the one or more TWT agreements comprises transmitting a TWT request, and wherein a Link Identifier (ID) Bitmap subfield of a TWT element in the TWT request indicates one or more links of the multiple links for which the one or more TWT agreements are requested to be established.

3. The method of claim 2, wherein the establishing of the one or more TWT agreements further comprises receiving a TWT response, and wherein a Link Identifier (ID) Bitmap subfield of a TWT element in the TWT response indicates the one or more links of the multiple links for which the one or more TWT agreements are requested to be established.

4. The method of claim 1, further comprising:

negotiating, by the processor as the first STA, a wake target beacon transmission time (TBTT) and a wake interval with a second AP affiliated with the AP MLD; and receiving, by the processor, one or more beacon frames on the second link.

5. The method of claim 4, further comprising:

ending, by the processor as a second STA affiliated with the non-AP MLD and operating in the EMLSR mode on the second link, a transmission opportunity (TXOP) on the second link before the first STA receives a beacon frame scheduled at the negotiated TBTT.

6. The method of claim 5, wherein the ending of the TXOP comprises ending the TXOP at least an EMLSR transition delay before the first STA receives the beacon frame scheduled at the negotiated TBTT, and wherein the EMLSR transition delay is indicated in an EMLSR Transition Delay subfield of an Enhanced Multi-Link (EML) Capabilities subfield in a Common Info field of a Basic Multi-Link element.

7. The method of claim 1, wherein the TWT Teardown frame comprises a TWT flow identifier comprising:

a first subfield indicating whether a link identification (ID) bitmap is present;

a second subfield indicating whether the TWT Teardown frame applies to all TWTs; and a third subfield containing the link ID bitmap indicating one or more links to which the TWT Teardown frame applies, in an event that the first subfield indicating a presence of the link ID bitmap.

8. An apparatus, comprising:

a transceiver configured to communicate wirelessly; and a processor coupled to the transceiver and configured to perform, as a non-access point (non-AP) multi-link device (MLD), operations comprising:

enabling an enhanced multi-link single-radio (EMLSR) mode by performing operations comprising:

establishing, via the transceiver, one or more target wake time (TWT) agreements comprising a concurrent TWT agreement with an access point (AP) MLD on a first link and a second link of multiple links such that data exchange between a first station (STA) affiliated with the non-AP MLD and a first AP affiliated with the AP MLD occurs on the first link during a TWT service period (SP) while an operation in the EMLSR mode is performed on the second link between the AP MLD and a second STA affiliated with the non-AP MLD; and switching from operating in the EMSLR mode to operating in a single radio mode on the second link responsive to the first STA transmitting a TWT Teardown frame on the first link to terminate the concurrent TWT agreement, wherein, prior to switching from the EMLSR mode to the single radio mode, the non-AP MLD transmits the TWT Teardown frame that selectively applies to one or more links to terminate the concurrent TWT agreement on the multiple links.

9. The apparatus of claim 8, wherein the establishing of the one or more TWT agreements comprises transmitting a TWT request, and wherein a Link Identifier (ID) Bitmap subfield of a TWT element in the TWT request indicates one or more links of the multiple links for which the one or more TWT agreements are requested to be established.

10. The apparatus of claim 9, wherein the establishing of the one or more TWT agreements further comprises receiving a TWT response, and wherein a Link Identifier (ID) Bitmap subfield of a TWT element in the TWT response indicates the one or more links of the multiple links for which the one or more TWT agreements are requested to be established.

11. The apparatus of claim 8, wherein the processor is further configured to perform operations comprising:

negotiating, as the first STA, a wake target beacon transmission time (TBTT) and a wake interval with a second AP affiliated with the AP MLD; and receiving, by the processor, one or more beacon frames on the second link.

12. The apparatus of claim 11, wherein the processor is further configured to perform operations comprising:

ending, by as a second STA affiliated with the non-AP MLD and operating in the EMLSR mode on the second link, a transmission opportunity (TXOP) on the second link before the first STA receives a beacon frame scheduled at the negotiated TBTT.

13. The apparatus of claim 12, wherein the ending of the TXOP comprises ending the TXOP at least an EMLSR transition delay before the first STA receives the beacon frame scheduled at the negotiated TBTT, and wherein the EMLSR transition delay is indicated in an EMLSR Transition Delay subfield of an Enhanced Multi-Link (EML) Capabilities subfield in a Common Info field of a Basic Multi-Link element.

14. The apparatus of claim 8, wherein the TWT Teardown frame comprises a TWT flow identifier comprising:

a first subfield indicating whether a link identification (ID) bitmap is present;

a second subfield indicating whether the TWT Teardown frame applies to all TWTs; and a third subfield containing the link ID bitmap indicating one or more links to which the TWT Teardown frame applies, in an event that the first subfield indicating a presence of the link ID bitmap.

* * * * *